United States Patent

Iwasaki et al.

[11] Patent Number: 5,811,513
[45] Date of Patent: Sep. 22, 1998

[54] PROCESS FOR PRODUCING POLYETHYLENE NAPHTHALATE

[75] Inventors: Hiroshi Iwasaki; Masayasu Ishibashi; Hiromi Ueki; Shoji Hiraoka; Toru Matsuyoshi; Satoshi Inoki, all of Waki-cho, Japan

[73] Assignee: Mitsui Petrochemical Industries, Ltd., Tokyo, Japan

[21] Appl. No.: 860,701

[22] PCT Filed: Oct. 25, 1996

[86] PCT No.: PCT/JP96/03116

§ 371 Date: Jul. 9, 1997

§ 102(e) Date: Jul. 9, 1997

[87] PCT Pub. No.: WO97/17391

PCT Pub. Date: May 15, 1997

[30] Foreign Application Priority Data

Nov. 10, 1995 [JP] Japan ..................................... 7-293102
Sep. 6, 1996 [JP] Japan ..................................... 8-236625
Sep. 6, 1996 [JP] Japan ..................................... 8-236626

[51] Int. Cl.$^6$ ..................................................... C08G 63/78
[52] U.S. Cl. ........................... 528/279; 528/272; 528/275; 528/280; 528/281; 528/282; 528/283; 528/284; 528/285; 528/298; 528/308; 528/485; 528/503
[58] Field of Search ..................................... 528/279, 275, 528/280, 281, 282, 283, 284, 285, 298, 308, 485, 503, 272

[56] References Cited

U.S. PATENT DOCUMENTS 5,294,695 3/1994 Lee et al. ............................... 528/279
5,350,829 9/1994 Kawamoto ............................ 528/272

FOREIGN PATENT DOCUMENTS 0630930 12/1994 European Pat. Off. .
1472777 5/1977 United Kingdom .

OTHER PUBLICATIONS

Encyclopedia of Polymer Science and Engineering, vol. 12, pp. 9–36.

Primary Examiner—Terressa Mosley
Attorney, Agent, or Firm—Sherman and Shalloway

[57] ABSTRACT

In the production of polyethylene naphthalate of the present invention, the esterification reaction between naphthalenedicarboxylic acid and ethylene glycol is conducted while causing water to be present in a reaction system from a start of reaction, in the presence of at least one catalyst selected from the group consisting of nitric, carboxylic, phosphoric and hydrogenphosphoric acid metal salts and alkyl amines according to necessity, to thereby attain an esterification ratio of 45 to 80%, so that a liquid mixture of naphthalenedicarboxylic acid esterification reaction products containing naphthalenedicarboxylic acid, carboxylhydroxyethoxycarbonylnaphthalene and bis (hydroxyethoxycarbonyl)naphthalene is obtained. Subsequently, a crystallized reaction product is separated from this liquid mixture to thereby obtain a mixture of esterification reaction products. Thereafter, this mixture having ethylene glycol added thereto according to necessity is subjected to polycondensation. The polyethylene naphthalate obtained by the process of the present application ensures a low content of naphthalenedicarboxylic acid esters each having diethylene glycol skeleton therein, thereby having excellent quality, for example, in appearance.

23 Claims, 2 Drawing Sheets

PROCESS FOR PRODUCING POLYETHYLENE NAPHTHALATE

TECHNICAL FIELD

The present invention relates to a process for producing polyethylene naphthalate which enables producing polyethylene naphthalate within a time shorter than in the conventional process.

Further, the present invention relates to a liquid mixture of naphthalenedicarboxylic acid esterification reaction products having a low content of naphthalenedicarboxylic acid esters each having diethylene glycol skeleton therein and relates to a process for producing the same.

Still further, the present invention relates to a mixture of naphthalenedicarboxylic acid esterification reaction products having a low content of naphthalenedicarboxylic acid esters each having diethylene glycol skeleton therein, to a process for producing the same and to a process for producing polyethylene naphthalate from this mixture.

BACKGROUND ART

The polyethylene naphthalate is generally produced by reacting naphthalenedicarboxylic acid or its ester derivative (for example, a lower alkyl ester or a phenyl ester) with ethylene glycol or its ester derivative (for example, a monocarboxylic ester ethylene oxide) to thereby obtain a naphthalenedicarboxylic acid/ethylene glycol ester and conducting a polycondensation of this ester in the presence of a polycondensation catalyst. The above esterification reaction is carried out under the reflux of ethylene glycol while removing water or alcohol formed by the reaction outside the reaction system.

However, completing the above esterification reaction takes a prolonged period of time, so that production of polyethylene naphthalate inevitably takes a prolonged period of time. Further, the esterification reaction taking a prolonged period of time may be accompanied by the formation of reaction products which deteriorate, for example, the appearance of obtained polyethylene naphthalate molding. Therefore, accelerating the esterification reaction enables not only shortening the production time for polyethylene naphthalate but also reducing the formation of reaction products which deteriorate the quality of final product, so that its technological value is magnificent.

Reaction of naphthalenedicarboxylic acid with ethylene glycol leads to the formation of esterification reaction products containing carboxyl-hydroxyethoxycarbonylnaphthalene and bis(hydroxyethoxycarbonyl)naphthalene, which reaction products further contain naphthalenedicarboxylic acid esters each having diethylene glycol skeleton (hereinafter may be referred to as "NDA-DEG") in addition to the above components.

This NDA-DEG is likely to deteriorate the quality, for example, the appearance of obtained polyethylene naphthalate. Therefore, obtaining naphthalenedicarboxylic acid esterification reaction products wherein the content of NDA-DEG is low enables improving the quality of polyethylene naphthalate, so that its technological value is magnificent.

The present invention has been made in view of the above prior art. An object of the present invention is to provide a process for producing polyethylene naphthalate which enables producing polyethylene naphthalate within a time shorter than in the conventional process and in which the formation of reaction products likely to deteriorate, for example, the appearance of polyethylene naphthalate molding can be reduced.

Another object of the present invention is to provide a liquid mixture of naphthalenedicarboxylic acid esterification reaction products having a low content of naphthalenedicarboxylic acid esters each having diethylene glycol skeleton therein and to provide a process for producing the same.

A further object of the present invention is to provide a mixture of naphthalenedicarboxylic acid esterification reaction products having a low content of naphthalenedicarboxylic acid esters each having diethylene glycol skeleton therein, to provide a process for producing the same and to provide a process for polyethylene naphthalate from this mixture.

DISCLOSURE OF THE INVENTION

The first process for producing polyethylene naphthalate according to the present invention comprises the steps of:

reacting naphthalenedicarboxylic acid with ethylene glycol in the presence of water to thereby effect an esterification;

advancing the esterification reaction while removing water to thereby obtain a naphthalenedicarboxylic acid/ethylene glycol esterification product; and conducting a polycondensation of the esterification product.

In the present invention, the esterification reaction conducted in the presence of water can be carried out in the copresence of at least one catalyst selected from the group consisting of nitric, carboxylic, phosphoric and hydrogenphosphoric acid metal salts and amines. This catalyst may be at least one member selected from the group consisting of cobalt nitrate, manganese acetate, sodium dihydrogenphosphate and triethylamine.

It is preferred that, in the above esterification reaction conducted in the presence of water, the amount of water be 0.03 to 1.5 times, especially 0.1 to 0.7 time that of ethylene glycol on a weight basis.

Further, it is preferred that the esterification reaction conducted in the presence of water attain an esterification ratio of 40 to 95%.

The present invention enables completing the esterification of naphthalenedicarboxylic acid within a time shorter than in the conventional process. Thus, polyethylene naphthalate can be produced within a time shorter than in the conventional process. Further, the present invention can suppress the formation of NDA-DEG.

The process for producing a liquid mixture of naphthalenedicarboxylic acid esterification reaction products according to the present invention comprises reacting naphthalenedicarboxylic acid with ethylene glycol while causing water to be present in a reaction system from a start of reaction to thereby attain an esterification ratio of 45 to 80% so that a liquid mixture of esterification reaction products containing naphthalenedicarboxylic acid, carboxyl-hydroxyethoxycarbonylnaphthalene and bis(hydroxyethoxycarbonyl)naphthalene is obtained.

In the present invention, this esterification reaction can be carried out in the copresence of at least one catalyst selected from the group consisting of nitric, carboxylic, phosphoric and hydrogenphosphoric salts and amines. The above catalyst may be at least one member selected from the group consisting of cobalt nitrate, manganese acetate, sodium dihydrogenphosphate and triethylamine.

The liquid mixture of naphthalenedicarboxylic acid esterification reaction products according to the present invention is obtained by the above process and contains naphthalenedicarboxylic acid, carboxylhydroxyethoxycarbonylnaphthalene and bis(hydroxyethoxycarbonyl)naphthalene.

The process for producing a mixture of naphthalenedicarboxylic acid esterification reaction products according to the present invention comprises separating a crystallized reaction product from the above liquid mixture of naphthalenedicarboxylic acid esterification reaction products to thereby obtain a mixture of esterification reaction products containing naphthalenedicarboxylic acid, carboxylhydroxyethoxycarbonylnaphthalene and bis(hydroxyethoxycarbonyl)naphthalene.

It is preferred that the obtained mixture of naphthalenedicarboxylic acid esterification reaction products contain, in an amount of not greater than 3 mol % based on all naphthalenedicarboxylic acid components of the mixture of naphthalenedicarboxylic acid esterification reaction products, naphthalenedicarboxylic acid esters each having diethylene glycol skeleton represented by the formulae:

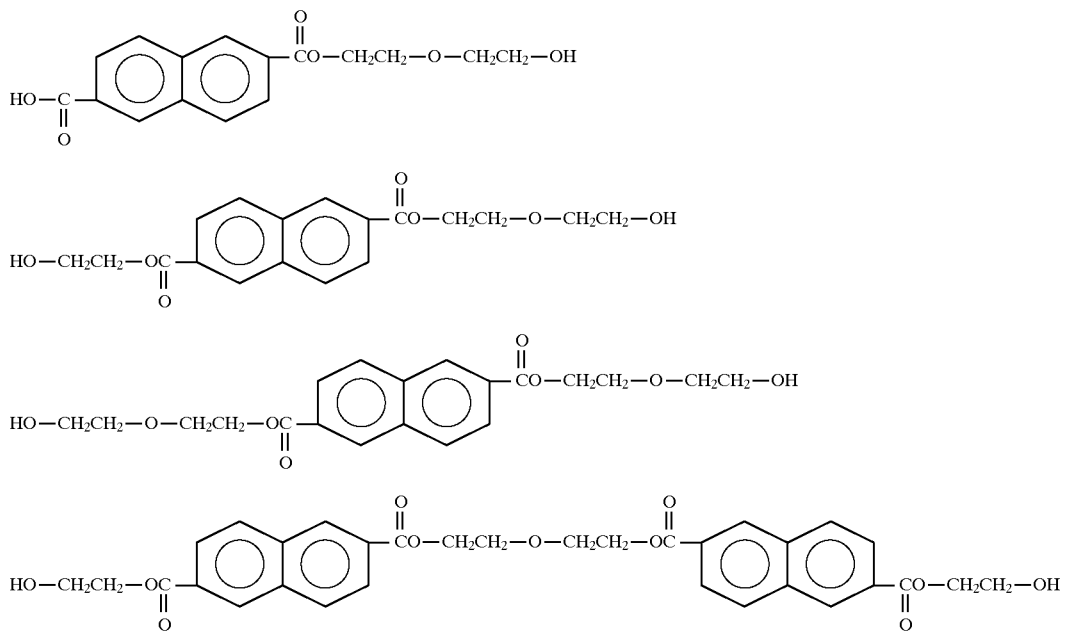

The mixture of naphthalenedicarboxylic acid esterification reaction products according to the present invention is obtained by the above process and contains naphthalenedicarboxylic acid, carboxylhydroxyethoxycarbonylnaphthalene and bis(hydroxyethoxycarbonyl)naphthalene. In this mixture of naphthalenedicarboxylic acid esterification reaction products, it is preferred that the content of naphthalenedicarboxylic acid esters each having diethylene glycol skeleton represented by the above formulae be not greater than 3 mol % based on all naphthalenedicarboxylic acid components of the mixture of naphthalenedicarboxylic acid esterification reaction products.

The second process for producing polyethylene naphthalate according to the present invention comprises conducting a polycondensation of the above mixture of naphthalenedicarboxylic acid esterification reaction products, optionally, having ethylene glycol added thereto.

Polyethylene naphthalate which is excellent in the quality, for example, appearance can be provided by the present invention.

BEST MODE FOR CARRYING OUT THE INVENTION

Figure 1:
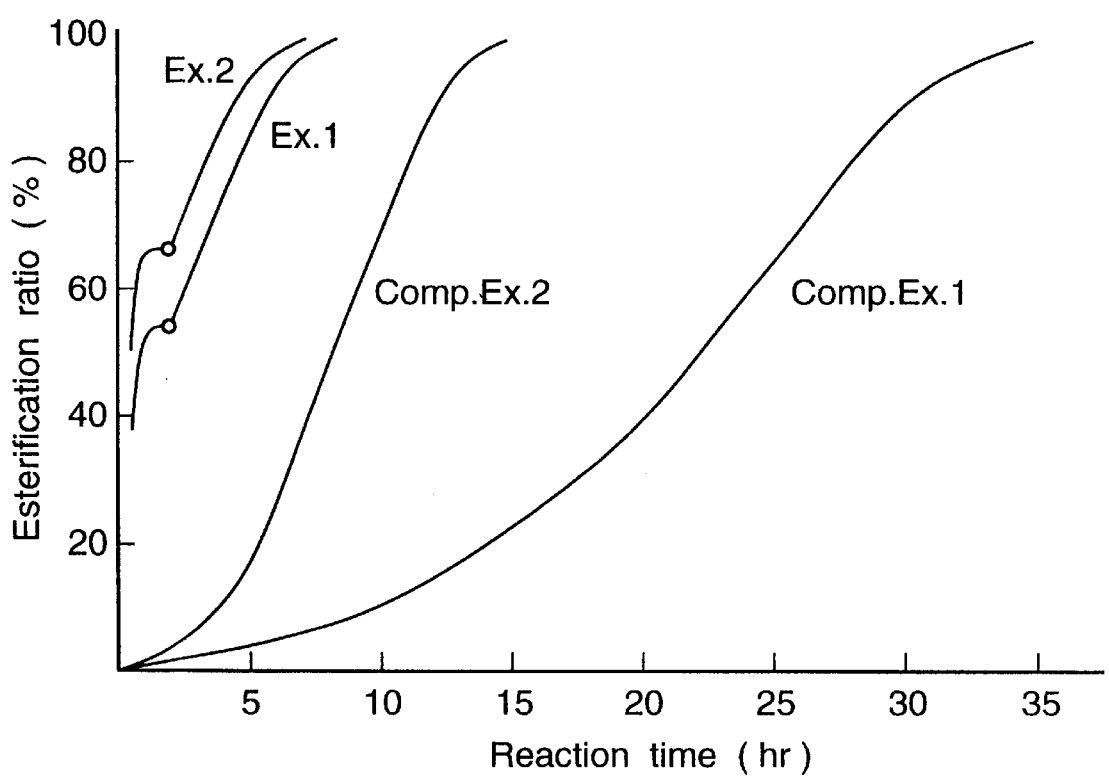
FIG. 1 is a graph showing the relationship between reaction time and esterification ratio with respect to Examples 1 and 2 and Comparative Examples 1 and 2.

In the first process for producing polyethylene naphthalate according to the present invention, naphthalenedicarboxylic acid is reacted with ethylene glycol in the presence of water to thereby effect an esterification; the esterification reaction is advanced while removing water to thereby obtain a naphthalenedicarboxylic acid/ethylene glycol esterification product; and the esterification product is polycondensed.

In the first step of the present invention, naphthalenedicarboxylic acid and ethylene glycol are subjected to esterification reaction in the presence of water (esterification reaction (1)). This esterification reaction between naphthalenedicarboxylic acid and ethylene glycol is conducted in the presence of water whose amount is generally 0.03 to 1.5 times, preferably, 0.1 to 0.7 time that of ethylene glycol on a weight basis. Ethylene glycol is generally added in an amount of 0.6 to 30 mol, preferably, 1.2 to 15 mol per mol of naphthalenedicarboxylic acid.

The water mentioned above includes not only the water present in the reaction system from the start of reaction but also the water formed by the esterification reaction between naphthalenedicarboxylic acid and ethylene glycol. In the esterification reaction (1), although the amount of water in the reaction system is increased in accordance with the advance of the reaction, the esterification reaction can be executed while distilling off part of water to thereby regulate the amount of water in the reaction system within a given range. The esterification reaction (1) also includes a mode in which no water is present in the reaction system at the start of reaction and in which the reaction is carried out in the presence of water formed by the esterification reaction-without removing this water outside the reaction system.

The esterification reaction (1) is generally conducted at 180° to 280° C., preferably, 200° to 260° C. under a pressure of 0 to 30 kg/cm$^2$, preferably, 0.5 to 20 kg/cm$^2$. Although depending on reaction conditions, the reaction time generally ranges from 0.2 to 6 hr, preferably, from 0.5 to 3 hr.

Although depending on the proportion of water present in the reaction system, the esterification ratio at the completion of the esterification reaction (1) generally ranges from 40 to 95%, preferably, from 45 to 80% and, still preferably, from 60 to 80%.

The terminology "esterification ratio (%)" used herein means a value calculated by the formula:

$$\text{Esterification ratio (\%)} = \frac{\text{No. of esterified carboxyl groups}}{\text{No. of all carboxyl groups before esterification}} \times 100$$

In the present invention, the above esterification reaction (1) can be conducted in the copresence of a specified catalyst. This catalyst may be at least one member selected from the group consisting of nitric, carboxylic, phosphoric and hydrogenphosphoric acid metal salts and amines. More specifically, this catalyst may be at least one member selected from the group consisting of cobalt nitrate, manganese acetate, sodium dihydrogenphosphate and triethylamine. The above catalyst is added in an amount of 10 to 0.001% by weight, preferably, 1 to 0.01% by weight based on the sum of naphthalenedicarboxylic acid and ethylene glycol. The reaction conditions, such as the amounts of naphthalenedicarboxylic acid, ethylene glycol and water, reaction temperature, reaction time and esterification ratio, to be employed in the esterification reaction (1) conducted in the copresence of the above catalyst are the same as mentioned above. The above catalyst not only promotes the esterification reaction between naphthalenedicarboxylic acid and ethylene glycol but also suppresses the formation of NDA-DEG.

The esterification reaction conducted in the presence of specified catalyst and specified amount of water enables sharp reduction of the period of time taken to achieve a given esterification ratio and further enables suppressing the formation of NDA-DEG as compared with the conventional process in which the esterification is conducted while removing formed water.

Subsequently, a further esterification reaction (esterification reaction (2)) is carried out while removing the above water and water formed by the esterification outside the reaction system. Since this esterification reaction (2) is carried out while removing water formed by the esterification outside the reaction system, the amount of water present in the reaction system is generally not greater than 0.1% by weight based on ethylene glycol.

The esterification reaction (2) is generally conducted at 180° to 280° C., preferably, 220° to 240° C. under a pressure (gauge) of 0 to 30 kg/cm$^2$, preferably, 1 to 15 kg/cm$^2$. The esterification ratio at the completion of the esterification reaction (2) is generally at least 93%, preferably, at least 97%.

The above esterification reaction (1) and esterification reaction (2) produce a naphthalenedicarboxylic acid/ethylene glycol ester (low order condensate) whose number average molecular weight generally ranges from 500 to 2000.

Although these esterification reactions can be conducted without any material other than naphthalenedicarboxylic acid and ethylene glycol added thereto, they can be conducted in the presence of a polycondensation catalyst described below and further a small amount of basic compound can be added to the reaction system.

In the present invention, since the esterification reaction (esterification reaction (1)) is effected in the presence of a specified amount of water until a specified esterification ratio is attained, the period of time taken to achieve a given esterification ratio can sharply reduced as compared with the conventional process in which the esterification is conducted while removing formed water. Therefore, the esterification time can be rendered shorter than in the conventional process, irrespective of the subsequent esterification reaction conducted while removing formed water (esterification reaction (2)) as in the conventional process.

It can be mentioned as a further effect of the esterification reaction (1) conducted in the presence of water according to the present invention to enable suppressing the formation of naphthalenedicarboxylic acid esters (NDA-DEG) each having diethylene glycol skeleton represented by the following formulae which are formed as by-product in the esterification reaction and which deteriorate the quality of polyethylene naphthalate obtained by the subsequent polycondensation reaction. In this connection, causing water to be present in the reaction system from the start of reaction enhances the effect of suppressing the formation of NDA-DEG.

Formulae of NDA-DEG

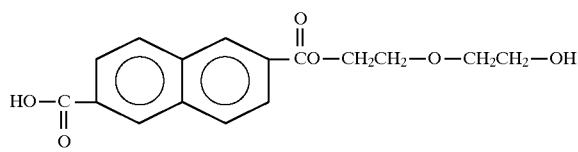

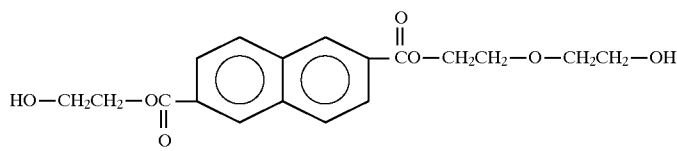

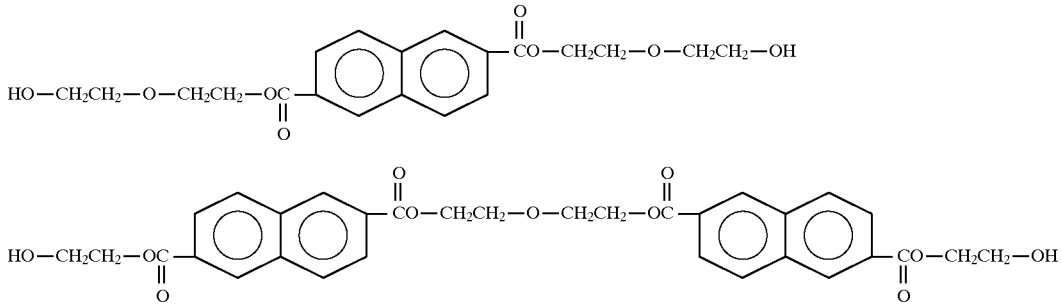
-continued

The execution of the esterification reaction (1) in the presence of a specified amount of water and in the copresence of a specified catalyst enables not only sharply reducing the esterification time but also more effectively suppressing the formation of NDA-DEG as compared with the conventional process. In this connection, causing water to be present in the reaction system from the start of reaction enhances the effect of suppressing the formation of NDA-DEG.

The thus obtained esterification product is subjected to polycondensation reaction.

This polycondensation reaction is carried out in the customary manner, that is, by heating in reduced pressure in the presence of a polycondensation catalyst at temperatures not lower than the melting point of obtained polyethylene naphthalate while distilling off formed glycol outside the reaction system. The polycondensation reaction is generally conducted at 250° to 290° C., preferably, 260° to 280° C. under a pressure of up to 500 Torr, preferably, up to 200 Torr.

The above polycondensation reaction is conducted in the liquid phase in the presence of a polycondensation catalyst and in the copresence of a stabilizer according to necessity.

Examples of suitable polycondensation catalysts include germanium compounds such as germanium dioxide, germanium tetraethoxide and germanium tetra-n-butoxide, antimony catalysts such as antimony trioxide and titanium catalysts such as titanium tetrabutoxide. It is preferred that the polycondensation catalyst be added in an amount of 0.0005 to 0.2% by weight, especially, 0.001 to 0.05% by weight, in terms of the weight of metal of the polycondensation catalyst, based on the sum of naphthalenedicarboxylic acid and ethylene glycol.

The liquid mixture of naphthalenedicarboxylic acid esterification reaction products, process for producing the same, and process for producing polyethylene naphthalate from the above mixture according to the present invention will be described below.

The liquid mixture of naphthalenedicarboxylic acid. esterification reaction products according to the present invention is obtained by reacting naphthalenedicarboxylic acid with ethylene glycol while causing water to be present in a reaction system from a start of reaction to thereby effect an esterification.

This esterification reaction between naphthalenedicarboxylic acid and ethylene glycol is conducted in the presence of water whose amount is generally 0.03 to 1.5 times, preferably, 0.1 to 0.7 time that of ethylene glycol on a weight basis. Ethylene glycol is generally added in an amount of 0.6 to 30 mol, preferably, 1.2 to 15 mol per mol of naphthalenedicarboxylic acid. In the present invention, generally, naphthalenedicarboxylic acid, ethylene glycol and water are mixed in the above proportions and the esterification reaction thereof is carried out.

Although water is formed by the esterification reaction between naphthalenedicarboxylic acid and ethylene glycol and hence the amount of water in the reaction system is increased in accordance with the advance of the esterification reaction, the esterification reaction can be executed while distilling off part of water to thereby regulate the amount of water in the reaction system within a given range.

This esterification reaction is generally conducted at 180° to 280° C., preferably, 200° to 260° C. under a pressure of 0 to 30 kg/cm$^2$, preferably, 0.5 to 20 kg/cm$^2$. Although depending on reaction conditions, the reaction time generally ranges from 0.2 to 6 hr, preferably, from 0.5 to 3 hr.

Although depending on the proportion of water present in the reaction system, the esterification ratio at the completion of the above esterification reaction generally ranges from 40 to 95%, preferably, from 45 to 80%. When the esterification ratio exceeds 80%, the content of the above naphthalenedicarboxylic acid esters each having diethylene glycol skeleton (NDA-DEG) may be so increased that the appearance of obtained polyethylene naphthalate is deteriorated.

The thus obtained liquid mixture of naphthalenedicarboxylic acid esterification reaction products contains naphthalenedicarboxylic acid, carboxylhydroxyethoxycarbonylnaphthalene and bis(hydroxyethoxycarbonyl)naphthalene. The content of NDA-DEG in the liquid mixture of naphthalenedicarboxylic acid esterification reaction products is generally as low as up to 3 mol %, preferably, up to 1 mol % and, still preferably, up to 0.5 mol % based on all naphthalenedicarboxylic acid components of the liquid mixture. The terminology "all naphthalenedicarboxylic acid components" used herein means the sum of unesterified naphthalenedicarboxylic acid and esterified naphthalenedicarboxylic acid.

This esterification reaction conducted in the presence of a specified amount of water from the start of reaction enables effectively suppressing the formation of NDA-DEG by-product as compared with the process in which the esterification is conducted while removing formed water.

In the present invention, the above esterification reaction can be conducted in the copresence of a specified catalyst. This catalyst may be at least one member selected from the group consisting of nitric, carboxylic, phosphoric and hydrogenphosphoric salts and amines. More specifically, this catalyst may be at least one member selected from the group consisting of cobalt nitrate, manganese acetate, sodium dihydrogenphosphate and triethylamine. The above catalyst is added in an amount of 10 to 0.001% by weight, preferably, 0.1 to 0.01% by weight based on the sum of naphthalenedicarboxylic acid and ethylene glycol. This catalyst not only promotes the esterification reaction between naphthalenedicarboxylic acid and ethylene glycol but also suppresses the formation of NDA-DEG. The reaction conditions, such as the amounts of naphthalenedicarboxylic acid, ethylene glycol and water, reaction temperature, reaction time and esterification ratio, to be employed in the esterification reaction conducted in the copresence of the above catalyst are the same as mentioned above.

The above esterification reaction conducted in the presence of specified catalyst and specified amount of water from the start of reaction enables more effectively suppressing the formation of NDA-DEG by-product.

The mixture of naphthalenedicarboxylic acid esterification reaction products according to the present invention is obtained by separating a crystallized reaction product from the above liquid mixture of naphthalenedicarboxylic acid esterification reaction products. Cooling of the liquid mixture of naphthalenedicarboxylic acid esterification reaction products below the above reaction temperature leads to crystallization of the mixture containing naphthalenedicarboxylic acid and naphthaenedicarboxylic acid esters.

The thus obtained mixture of naphthalenedicarboxylic acid esterification reaction products contains naphthalenedicarboxylic acid, carboxylhydroxyethoxycarbonylnaphthalene and bis(hydroxyethoxycarbonyl)naphthalene.

The content of the above naphthalenedicarboxylic acid esters each having diethylene glycol skeleton (NDA-DEG) in the mixture of naphthalenedicarboxylic acid esterification reaction products is generally as low as up to 3 mol %, preferably, up to 1 mol % and, still preferably, up to 0.5 mol % based on all naphthalenedicarboxylic acid components of the mixture.

This mixture of naphthalenedicarboxylic acid esterification reaction products has such a low content of components detrimental to the quality of polyethylene naphthalate, such as NDA-DEG, that polyethylene naphthalate of excellent quality can be produced from the above mixture of naphthalenedicarboxylic acid esterification reaction products.

The second process for producing polyethylene naphthalate according to the present invention comprises conducting a polycondensation of the above mixture of naphthalenedicarboxylic acid esterification reaction products, optionally, having ethylene glycol added thereto.

The polycondensation reaction is carried out in the customary manner, and the conditions thereof are the same as described above with respect to the first process for producing polyethylene naphthalate.

EFFECT OF THE INVENTION

In the first process for producing polyethylene naphthalate according to the present invention, part of the esterification between naphthalenedicarboxylic acid and ethylene glycol is effected in the presence of a specified amount of water and in the copresence of a specified catalyst according to necessity. Thus, the esterification reaction can be completed within a time shorter than in the conventional process. Accordingly, polyethylene naphthalate can be produced within a time shorter than in the conventional process. Moreover, the formation of impurities such as NDA-DEG is less in this process than in the conventional process.

In the process for producing a liquid mixture of naphthalenedicarboxylic acid esterification reaction products according to the present invention, naphthalenedicarboxylic acid and ethylene glycol are esterified while causing water to be present in a reaction system from a start of reaction and in the copresence of a specified catalyst according to necessity. Thus, a liquid mixture of naphthalenedicarboxylic acid esterification reaction products is obtained in which the content of components detrimental to the quality of polyethylene naphthalate, such as naphthalenedicarboxylic acid esters each having diethylene glycol skeleton (NDA-DEG), is low. Polyethylene naphthalate of excellent quality can be produced from the above liquid mixture of naphthalenedicarboxylic acid esterification reaction products.

In the process for producing a mixture of naphthalenedicarboxylic acid esterification reaction products according to the present invention, a crystallized reaction product is separated from the above liquid mixture of naphthalenedicarboxylic acid esterification reaction products. Thus, a mixture of naphthalenedicarboxylic acid esterification reaction products is obtained in which the content of components detrimental to the quality of polyethylene naphthalate, such as NDA-DEG, is low. Polyethylene naphthalate of excellent quality can be produced from the above mixture of naphthalenedicarboxylic acid esterification reaction products.

In the second process for producing polyethylene naphthalate according to the present invention, polyethylene naphthalate is produced from the above mixture of naphthalenedicarboxylic acid esterification reaction products. Thus, polyethylene naphthalate of excellent quality can be produced.

EXAMPLE

The present invention will now be illustrated in greater detail with reference to the following Examples, which in no way limit the scope of the invention.

Example 1

Esterification reaction (1)

40 g of 2,6-naphthalenedicarboxylic acid (hereinafter referred to as "NDA"), 120 g of ethylene glycol (hereinafter referred to as "EG") and 80 g of water (0.67 time the weight of EG) were charged into a 500 ml autoclave and, after purging the autoclave with nitrogen (pressurized at 10 kg/cm$^2$), reacted at 250° C. for 2 hr, thereby obtaining a liquid mixture of NDA esterification reaction products.

Thereafter, the autoclave was cooled and the liquid mixture formed crystallized reaction product that was separated from the liquid, thereby recovering 44 g of crystal (mixture of NDA esterification reaction products). The composition of the recovered crystal was as shown below:

NDA: 23% by weight
NDA monoester (2-carboxyl-6-hydroxyethoxycarbonylnaphthalene): 46% by weight
NDA diester (2,6-bis(hydroxyethoxycarbonyl)naphthalene): 25% by weight
oligomer of NDA diester: 6% by weight
esterification ratio: 54%.

Esterification reaction (2)

The whole amount of the thus recovered crystallized product (44 g) and 150 g of EG were charged into a glass flask equipped with a simple distiller and immersed in an 80° C. oil bath, and the temperature thereof was raised to 225° C. over a period of 30 min. During the period, water running from the top of a distillation column was recovered. Heating was continued until there was no longer running of water formed in accordance with the advance of the esterification. The running of water was terminated 6 hr after the start of heating at 80° C. The time at which there was no longer running of water was regarded as the final point of the esterification.

The time taken by the esterification (time taken by the esterification step (1)+the time taken by the esterification step (2)) was 8 hr.

Example 2

Esterification reaction (1)

40 g of NDA, 160 g of EG and 40 g of water (0.25 time the weight of EG) were charged into a 500 ml autoclave and, after purging the autoclave with nitrogen (pressurized at 10 kg/cm$^2$), reacted at 250° C. for 2 hr, thereby obtaining a liquid mixture of NDA esterification reaction products. Thereafter, the autoclave was cooled and the liquid mixture formed a crystallized reaction product that was separated from the liquid, thereby recovering 50 g of crystal (mixture of NDA esterification reaction products). The composition of the recovered crystal was as shown below:

NDA: 14% by weight

NDA monoester: 39% by weight

NDA diester: 28% by weight oligomer of NDA diester: 19% by weight esterification ratio: 67%.

Esterification reaction (2)

The whole amount of the thus recovered crystal (50 g) and 150 g of EG were charged into a glass flask equipped with a simple distiller and immersed in an 80° C. oil bath, and the temperature thereof was raised to 225° C. over a period of 30 min. During the period, water running from the top of a distillation column was recovered. Heating was continued until there was no longer running of water formed in accordance with the advance of the esterification. The running of water was terminated 4.5 hr after the start of heating at 80° C. The time at which there was no longer running of water was regarded as the final point of the esterification. The time taken by the esterification was 6.5 hr.

Comparative Example 1

40 g of NDA and 160 g of EG were charged into a glass flask equipped with a simple distiller and immersed in an 80° C. oil bath, and the temperature thereof was raised to 225° C. over a period of 30 min. During the period, water running from the top of a distillation column was recovered. Heating was continued until there was no longer running of water formed in accordance with the advance of the esterification. The running of water was terminated 35 hr after the start of heating at 80° C. The time at which there was no longer running of water was regarded as the final point of the esterification. The time taken by the esterification was 35 hr.

Comparative Example 2

40 g of NDA and 160 g of EG were charged into an autoclave equipped with a simple distiller, and the temperature thereof was raised to 250° C. Esterification reaction was conducted under a pressure maintained at 1.7 kg/cm$^2$ while distilling formed water from a distillation column. Water distillation stopped 15 hr after the start of heating. The time at which there was no longer water distillation was regarded as the final point of the esterification reaction. The time taken by the esterification was 15 hr. The relationship between reaction time and esterification ratio with respect to Examples 1 and 2 and Comparative Examples 1 and 2 is shown in FIG. 1. In FIG. 1, the first about half part of the curve regarding Examples 1 and 2 corresponds to the esterification reaction (1) and the rest of the curve corresponds to the esterification reaction (2).

As shown in FIG. 1, although the reaction rates of the esterification reaction (2) of Examples 1 and 2 according to the process of the present invention are almost the same as in Comparative Example 2, the entire esterification rates are greater in Examples 1 and 2 than in Comparative Example 2 because of the superiority in the reaction rate of the esterification reaction (1).

Example 3

40 g of NDA, 120 g of EG and 80 g of water (0.67 time the weight of EG) were charged into a 500 ml autoclave and, after purging the autoclave with nitrogen (pressurized at 10 kg/cm$^2$), immersed in a heated oil bath to thereby raise the temperature to 250° C. Reaction solutions were sampled 1, 2, 3 and 4 hr after the temperature reached 250° C. Each reaction solution sample was cooled and the amount of NDA-DEG contained in the reaction solution sample was determined by the use of a liquid chromatograph. The results of determination of NDA-DEG content and esterification ratio for each of the above reaction solution samples are given in Table 1.

After the completion of the reaction, the autoclave was cooled to 25° C. and the liquid mixture formed a crystallized reaction product that was recovered from the solution.

TABLE 1

| Amt. of water/<br>amt. of EG at<br>charging: | Example 3 | | | |
|---|---|---|---|---|
| 0.67 by wt | 1 hour | 2 hours | 3 hours | 4 hours |
| NDA-DEG content<br>(mol %/charged NDA) | 0.1 | 0.2 | 0.9 | 2.1 |
| Esterification<br>ratio (%) | 22 | 27 | 40 | 52 |

Example 4

Esterification reaction was carried out in the same manner as in Example 3 except that 160 g of EG and 40 g of water (0.25 time the weight of EG) were charged. The results of determination of NDA-DEG content and esterification ratio for each of the above reaction solution samples taken at the varied times are given in Table 2.

After the completion of the reaction, the autoclave was cooled to 25° C. and the samples formed a crystallized reaction product that was recovered from the solution.

TABLE 2

| Amt. of water/<br>amt. of EG at<br>charging: | Example 4 | | | |
|---|---|---|---|---|
| 0.25 by wt. | 1 hour | 2 hours | 3 hours | 4 hours |
| NDA-DEG content<br>(mol %/charged NDA) | 0.9 | 1.9 | 3.6 | 4.3 |
| Esterification<br>ratio (%) | 37 | 45 | 65 | 72 |

Example 5

100 g of NDA, 320 g of EG and 180 g of water (0.56 time the weight of EG) were charged into a 1000 ml autoclave and, after purging the autoclave with nitrogen (pressurized at 10 kg/cm$^2$), reacted at 240° C. for 3 hr, thereby obtaining a mixture of NDA esterification reaction products in the form of a solution.

Thereafter, the reaction solution was taken out and 1000 ml of distilled water was added thereto to thereby effect crystallization. The crystallized reaction product was recovered by filtration and dried, thereby recovering 129 g of mixture of NDA esterification reaction products. The composition of the recovered crystal (mixture of NDA esterification reaction products) was as shown below:

NDA: 21.2 mol %

NDA monoester: 48.2 mol %

NDA diester: 28.9 mol %

NDA-DEG: 0.3 mol % oligomer of NDA diester: 1.4 mol % esterification ratio: 54.7%.

In the filtrate, 0.7 mol % of NDA-DEG was detected.

The above procedure was repeated twice, thereby obtaining 240 g of mixture of NDA esterification reaction products.

This mixture of NDA esterification reaction products was charged into a glass flask equipped with a simple distiller and immersed in an 80° C. oil bath, and the temperature thereof was raised to 225° C. over a period of 30 min. Heating was continued at that temperature. Water running from the top of a distillation column was recovered. The time at which there was no longer running of water formed in accordance with the advance of the esterification was regarded as the final point of the esterification.

21 mg of germanium dioxide as a polymerization catalyst, 15 mg of tetraethylammonium hydroxide as a stabilizer and 39 mg of phosphoric acid were dissolved in 5 g of EG and added to the NDA esters obtained by the above esterification reaction. The temperature of the NDA esters having the polymerization catalyst and stabilizer added thereto was raised to 260° C. and the NDA esters were agitated for 1 hr while recovering distilled EG. Subsequently, the pressure of the reaction system was reduced to 1 Torr or below while raising the temperature thereof to 280° C. over a period of 1 hr to thereby distill off EG. Further, the reaction was continued for 1.5 hr while distilling off EG at 280° C. under a reduced pressure of 1 Torr or below. Then, the reaction was terminated and formed polyethylene naphthalate was recovered.

The recovered polyethylene naphthalate had an intrinsic viscosity of 0.55 dl/g (dissolved in a 1:1 mixed solution of o-chlorophenol and phenol and measured at 25° C.), a glass transition temperature (Tg) of 118° C. as measured by a differential scanning calorimeter, a melting temperature (Tm) of 268° C. and an NDA-DEG content of 0.94% by weight.

Comparative Example 3

40 g of NDA and 200 g of EG. were charged into a 500 ml autoclave without the charging of water and, after purging the autoclave with nitrogen (pressurized at 10 kg/cm²), immersed in a heated oil bath to thereby raise the temperature to 250° C. Reaction solutions were sampled 20 min, 40 min, 1 hr and 2 hr after the temperature reached 250° C. This esterification reaction was conducted without removing water formed during the reaction outside the reaction system. Each reaction solution sample was cooled and the amount of by-product NDA-DEG contained in the reaction solution sample was determined by the use of a liquid chromatograph. The results of determination of NDA-DEG content and esterification ratio for each of the above reaction solution samples obtained at the varied reaction times are given in Table 3.

After the completion of the reaction, the autoclave was cooled to 25° C. and a crystallized product was recovered from the solution.

TABLE 3

| Amt. of water | Comparative Example 3 | | | |
|---|---|---|---|---|
| at charging: 0 | 20 min. | 40 min. | 1 hour | 2 hours |
| NDA-DEG content (mol %/charge NDA) | 2.1 | 6.5 | 14.1 | 19.3 |
| Esterification ratio (%) | 21 | 33 | 60 | 86 |
| Amt. of water/ amt. of EG (water/EG) (wt. ratio) | 0.007 | 0.012 | 0.021 | 0.03 |

Figure 2:
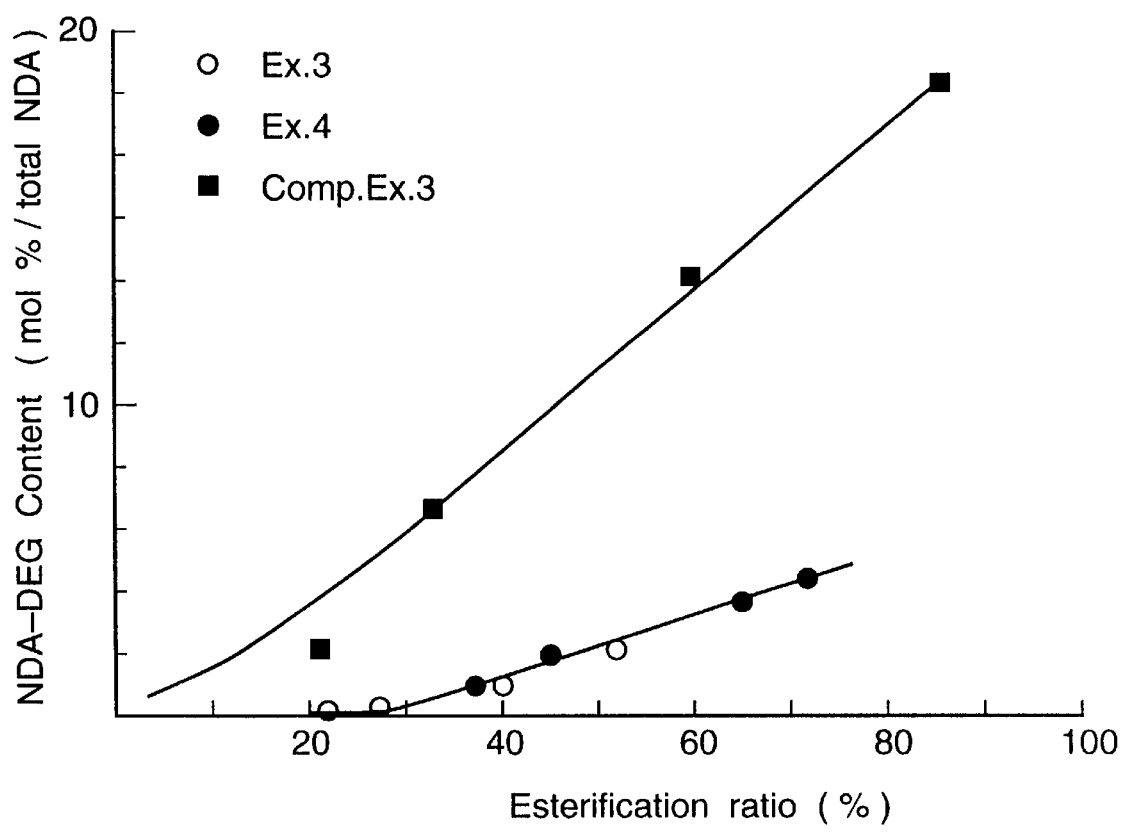
FIG. 2 is a graph showing the relationship between esterification ratio and NDA-DEG content with respect to Examples 3 and 4 and Comparative Example 3.

The relationship between esterification ratio and NDA-DEG content with respect to Examples 3 and 4 and Comparative Example 3 is shown in FIG. 2.

As apparent from FIG. 2, the process of the present invention in which the esterification is carried out while causing water to be present from the start of esterification reaction has a suppressed increase of NDA-DEG content even when the esterification ratio is increased. By contrast, when the esterification reaction is carried out without the charging of water as in Comparative Example 3, the amount of NDA-DEG formed as by-product is large because the amount of water attributed to the formation of water in the reaction system is minute even if the reaction is effected without removing water formed during the esterification reaction outside the reaction system.

Example 6

100 g of NDA, 220 g of EG and 40 g of water (0.18 time the weight of EG) were charged into a 1000 ml autoclave and, after purging the autoclave with nitrogen (pressurized at 10 kg/cm²), reacted at 250° C. for 3 hr. The thus obtained reaction solution was cooled, taken out from the autoclave and subjected to solid/liquid separation by a centrifugal separator. Thus, 212 g of a reaction product mixture moist with an aqueous ethylene glycol solution of an esterification reaction product mixture consisting of 45% by weight of an aqueous ethylene glycol solution and 55% by weight of NDA esterification reaction product mixture was recovered.

Analyses of the composition of this reaction product mixture by liquid chromatography showed that the esterification ratio was 55.6%. Further, analyses of the composition of this reaction product mixture by gas chromatography showed that the total of the content of diethylene glycol units in NDA-DEG, in terms of diethylene glycol, and the content of diethylene glycol was 0.46% by weight.

The above procedure was repeated twice, thereby obtaining 420 g of the reaction product mixture. This reaction product mixture was charged into a glass flask equipped with a simple distiller and immersed in an 80° C. oil bath, and the temperature thereof was raised to 225° C. over a period of 30 min. Heating was continued at that temperature. Water running from the top of a distillation column was recovered. The time at which there was no longer running of water formed in accordance with the advance of the esterification was regarded as the final point of the esterification.

21 mg of germanium dioxide as a polymerization catalyst, 15 mg of tetraethylammonium hydroxide as a stabilizer and 39 mg of phosphoric acid were dissolved in 5 g of EG and added to the NDA esters obtained by the above esterification reaction. The temperature of the NDA esters having the polymerization catalyst and stabilizer added thereto was raised to 260° C. and the NDA esters were agitated for 1 hr while recovering distilled EG. Subsequently, the pressure of the reaction system was reduced to 1 Torr or below while raising the temperature thereof to 280° C. over a period of 1 hr to thereby distill off EG. Further, the reaction was continued for 1.5 hr while distilling off EG at 280° C. under a reduced pressure of 1 Torr or below. Then, the reaction was terminated and formed polyethylene naphthalate was recovered.

The recovered polyethylene naphthalate had an intrinsic viscosity of 0.55 dl/g (dissolved in a 1:1 mixed solution of o-chlorophenol and phenol and measured at 25° C.), a glass transition temperature (Tg) of 118° C. as measured by a differential scanning calorimeter, a melting temperature (Tm) of 267° C. and a diethylene glycol unit content of 1.6% by weight.

Example 7

2 g of NDA, 6.5 g of EG, 3.5 g of water (0.54 time the weight of EG) and 0.5 g of sodium dihydrogenphosphate were charged into a 50 ml autoclave and, after purging the autoclave with nitrogen (pressurized at 10 kg/cm$^2$), reacted at 250° C. for 3 hr, thereby obtaining a liquid mixture of NDA esterification reaction products.

Thereafter, the liquid mixture was taken out and 100 ml of distilled water was added thereto to thereby effect crystallization. The crystallized product was recovered by filtration and dried, thereby obtaining 2.2 g of mixture of NDA esterification reaction products. The results of analyses of the composition of the mixture of NDA esterification reaction products and NDA-DEG by liquid chromatography are given in Table 4.

Example 8

A liquid mixture of NDA esterification reaction products and a mixture of NDA esterification reaction products were obtained in the same manner as in Example 7 except that cobalt nitrate was used in place of sodium dihydrogenphosphate. The results are given in Table 4.

Example 9

A liquid mixture of NDA esterification reaction products and a mixture of NDA esterification reaction products were obtained in the same manner as in Example 7 except that manganese acetate was used in place of sodium dihydrogenphosphate. The results are given in Table 4.

Example 10

A liquid mixture of NDA esterification reaction products and a mixture of NDA esterification reaction products were obtained in the same manner as in Example 7 except that triethylamine was used in place of sodium dihydrogenphosphate. The results are given in Table 4.

Example 11

A liquid mixture of NDA esterification reaction products and a mixture of NDA esterification reaction products were obtained in the same manner as in Example 7 except that sodium dihydrogenphosphate was not employed. The results are given in Table 4.

TABLE 4

| | Catalyst | Esterification rate (%) | NDA-DEG (mol %) |
| --- | --- | --- | --- |
| Example 7 | sodium dihydrogenphosphate | 60.6 | 0.5 |
| Example 8 | Cobalt nitrate | 64.9 | 0.2 |
| Example 9 | Manganese acetate | 49.8 | 0.2 |
| Example 10 | Triethylamine | 38.7 | 0.2 |
| Example 11 | Not added | 41.8 | 1.3 |

Example 12

A liquid mixture of NDA esterification reaction products were obtained in the same manner as in Example 7 except that the amount of sodium dihydrogenphosphate added was changed to 0.25 g. The results are given in Table 5.

Example 13

A liquid mixture of NDA esterification reaction products were obtained in the same manner as in Example 7 except that the amount of sodium dihydrogenphosphate added was changed to 0.05 g. The results are given in Table 5.

TABLE 5

| | Sodium dihydrogen-phosphate (g) | Esterification ratio (%) | NDA-DEG (mol %) |
| --- | --- | --- | --- |
| Example 7 | 0.5 | 60.6 | 0.5 |
| Example 12 | 0.25 | 51.6 | 0.6 |
| Example 13 | 0.05 | 54.7 | 0.3 |

Example 14

100 g of NDA, 320 g of EG, 180 g of water (0.56 time the weight of EG) and 1.0 g of sodium dihydrogenphosphate were charged into a 1000 ml autoclave and, after purging the autoclave with nitrogen (pressurized at 10 kg/cm$^2$), reacted at 250° C. for 3 hr. The resultant reaction solution was taken out, and 1000 ml of distilled water was added thereto to thereby effect crystallization. The crystallized product was collected by filtration and dried. Thus, 130 g of NDA esterification reaction product mixture was recovered. Analyses of the composition of this recovered crystallized product (mixture of NDA esterification reaction products) and NDA-DEG by liquid chromatography showed that the esterification ratio and NDA-DEG content were 55.2% and 0.3 mol %, respectively.

The above procedure was repeated twice, thereby obtaining 240 g of mixture of NDA esterification reaction products.

This mixture of NDA esterification reaction products was charged into a glass flask equipped with a simple distiller and immersed in an 80° C. oil bath, and the temperature thereof was raised to 225° C. over a period of 30 min. Heating was continued at that temperature. Water running from the top of a distillation column was recovered. The time at which there was no longer running of water formed in accordance with the advance of the esterification was regarded as the final point of the esterification.

21 mg of germanium dioxide as a polymerization catalyst, 15 mg of tetraethylammonium hydroxide as a stabilizer and 39 mg of phosphoric acid were dissolved in 5 g of EG and added to the NDA esters obtained by the above esterification reaction. The temperature of the NDA esters having the polymerization catalyst and stabilizer added thereto was raised to 260° C. and the NDA esters were agitated for 1 hr while recovering distilled EG. Subsequently, the pressure of the reaction system was reduced to 1 Torr or below while raising the temperature thereof to 280° C. over a period of 1 hr to thereby distill off EG. Further, the reaction was continued for 1.5 hr while distilling off EG at 280° C. under a reduced pressure of 1 Torr or below. Then, the reaction was terminated and formed polyethylene naphthalate was recovered.

The recovered polyethylene naphthalate had an intrinsic viscosity of 0.55 dl/g (dissolved in a 1:1 mixed solution of o-chlorophenol and phenol and measured at 25° C.), a glass transition temperature (Tg) of 118° C. as measured by a differential scanning calorimeter, a melting temperature (Tm) of 268° C. and a DEG content of 0.94% by weight.

We claim:

1. A process for producing polyethylene naphthalate comprising the steps of:

reacting naphthalenedicarboxylic acid with ethylene glycol in the presence of an amount of water that is more than 0.03 to 1.5 times on a weight basis the amount of ethylene glycol to effect an esterification;

advancing the esterification reaction while removing water to obtain a naphthalenedicarboxylic acid/ethylene glycol esterification product; and conducting a polycondensation of the esterification product.

2. The process as claimed in claim 1, wherein the esterification reaction conducted in the presence of water is carried out in the copresence of at least one catalyst selected from the group consisting of nitric, carboxylic, phosphoric and hydrogenphosphoric acid metal salts and amines.

3. The process as claimed in claim 2, wherein the catalyst is at least one member selected from the group consisting of cobalt nitrate, manganese acetate, sodium dihydrogenphosphate and triethylamine.

4. The process as claimed in claim 1, wherein, in the esterification reaction conducted in the presence of water, the amount of water is 0.1 to 0.7 time on a weight basis the amount of ethylene glycol.

5. The process as claimed in claim 1, wherein the esterification reaction conducted in the presence of water achieves an esterification ratio of 40 to 95%.

6. A process for producing a liquid mixture of naphthalenedicarboxylic acid esterification reaction products, comprising reacting naphthalenedicarboxylic acid with ethylene glycol while causing water to be present in an amount that is more than 0.03 to 1.5 times on a weight basis the amount of ethylene glycol in a reaction system from a start of reaction to thereby obtain an esterification ratio of 45 to 80% and a liquid mixture of esterification reaction products containing naphthalenedicarboxylic acid, carboxyl-hydroxyethoxycarbonylnaphthalene and bis(hydroxyethoxycarbonyl)naphthalene.

7. The process as claimed in claim 6, wherein the esterification reaction is carried out in the copresence of at least one catalyst selected from the group consisting of nitric, carboxylic, phosphoric and hydrogenphosphoric acid metal salts and alkyl amines.

8. The process as claimed in claim 7, wherein the catalyst is at least one member selected from the group consisting of cobalt nitrate, manganese acetate, sodium dihydrogenphosphate and triethylamine.

9. A liquid mixture of naphthalenedicarboxylic acid esterification reaction products containing naphthalenedicarboxylic acid, carboxyl-hydroxyethoxycarbonylnaphthalene and bis(hydroxyethoxycarbonyl)naphthalene which is obtained by the process of claim 6.

10. A process as claimed in claim 6 for producing a mixture of naphthalenedicarboxylic acid esterification reaction products, comprising subjecting the liquid mixture of esterification reaction product to a crystallization step, separating a crystallized product from the liquid mixture of naphthalenedicarboxylic acid esterification reaction products to obtain from the crystallized product a mixture of esterification reaction products containing naphthalenedicarboxylic acid, carboxyl-hydroxyethoxycarbonylnaphthalene and bis(hydroxyethoxycarbonyl)naphthalene.

11. The process as claimed in claim 10, wherein the obtained mixture of esterification reaction products contains, in an amount of not greater than 3 mol % based on all naphthalenedicarboxylic acid components of the mixture of naphthalenedicarboxylic acid esterification reaction products, naphthalenedicarboxylic acid esters each having diethylene glycol skeleton represented by the formulae:

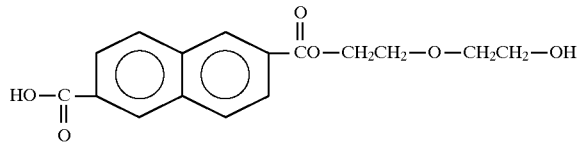

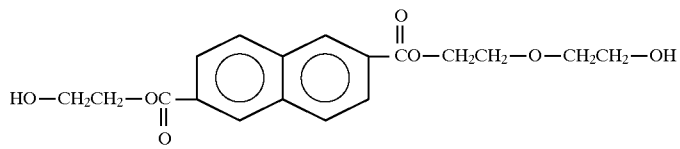

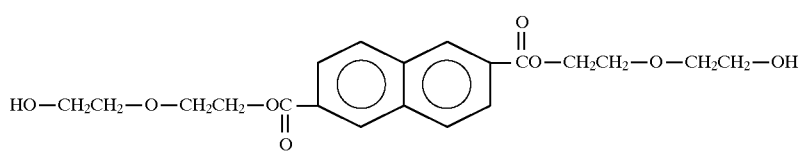

-continued

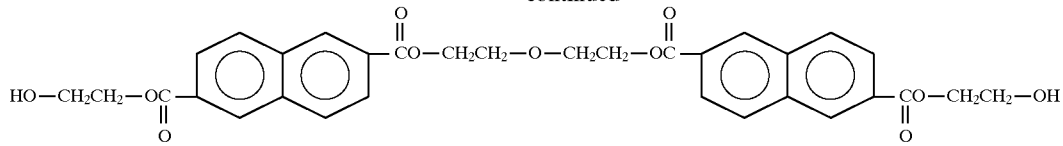

12. A mixture of naphthalenedicarboxylic acid esterification reaction products containing naphthalenedicarboxylic acid, carboxyl-hydroxyethoxycarbonylnaphthalene and bis (hydroxyethoxycarbonyl)naphthalene, which is obtained by the process as claimed in claim 10.

13. A process for producing polyethylene naphthalate, comprising conducting a polycondensation of the mixture of naphthalenedicarboxylic acid esterification reaction products of claim 10, optionally, having ethylene glycol added thereto.

14. The process as claimed in claim 1, wherein the naphthalenedicarboxylic acid/ethylene glycol esterification product contains less than 3 mol % of naphthalenedicarboxylic acid/diethylene glycol and the first reaction is carried out in 0.5 to 3 hr.

15. The process as claimed in claim 3, wherein a recovered naphthalenedicarboxylic acid/diethylene glycol esterification product contains less than 1 mol % of naphthalenedicarboxylic acid/diethylene glycol.

16. The process as claimed in claim 6, wherein in the esterification reaction conducted in the presence of water, the amount of water is 0.1 to 0.7 time on a weight basis the amount of ethylene glycol.

17. The process as claimed in claim 6, wherein the liquid mixture of esterification reaction products contain less than 3 mol % of naphthalenedicarboxylic acid/diethylene glycol and the first reaction is carried out in 0.5 to 3 hr.

18. The process as claimed in claim 8, wherein a recovered naphthalenedicarboxylic acid/ethylene glycol esterification product contains less than 1 mol % of naphthalenedicarboxylic acid/diethylene glycol.

19. A process for producing a liquid mixture of naphthalenedicarboxylic acid esterification reaction products, comprising in a first step reacting naphthalenedicarboxylic acid with 1.2 to 15 mol ethylene glycol per mol of naphthalenedicarboxylic acid while causing water to be present in an amount that is 0.1 to 0.7 time on a weight basis the amount of ethylene glycol in a reaction system from a start of reaction to thereby obtain an esterification ratio of 45 to 80% in 0.5 to 3 hours and a liquid mixture of esterification reaction products containing naphthalenedicarboxylic acid, carboxyl-hydroxyethoxycarbonylnaphthalene and bis (hydroxyethoxycarbonyl)naphthalene, and subsequently in a second step advancing the esterification reaction while removing water to obtain a naphthalenedicarboxylic acid/ethylene glycol reaction product.

20. The process as claimed in claim 19, wherein the naphthalenedicarboxylic acid esterification reaction is carried out in the presence of a catalyst which is at least one member selected from the group consisting of cobalt nitrate, manganese acetate, sodium dihydrogenphosphate and triethylamine.

21. A process as claimed in claim 19 for producing a mixture of naphthalenedicarboxylic acid esterification reaction products, comprising subjecting the liquid mixture of esterification reaction product to a crystallization step, separating a crystallized product from the liquid mixture of naphthalenedicarboxylic acid esterification reaction products to obtain from the crystallized product the mixture of esterification reaction products containing naphthalenedicarboxylic acid, carboxyl-hydroxyethoxycarbonylnaphthalene and bis(hydroxyethoxycarbonyl)naphthalene.

22. The process as claimed in claim 20, wherein the obtained mixture of esterification reaction products contains, in an amount of not greater than 1 mol % based on all naphthalenedicarboxylic acid components of the mixture of naphthalenedicarboxylic acid esterification reaction products of naphthalenedicarboxylic acid esterification products containing a diethylene glycol compound.

23. A process as claimed in claim 19 for producing polyethylene naphthalate, comprising further conducting a polycondensation of the mixture of naphthalenedicarboxylic acid esterification reaction products, optionally, having ethylene glycol added thereto.

* * * * *